US007181420B2

(12) United States Patent
Gonen-Friedman et al.

(10) Patent No.: US 7,181,420 B2
(45) Date of Patent: Feb. 20, 2007

(54) METHODS AND SYSTEMS FOR ONLINE SELF-SERVICE RECEIVABLES MANAGEMENT AND AUTOMATED ONLINE RECEIVABLES DISPUTE RESOLUTION

(75) Inventors: Editt Gonen-Friedman, Sunnyvale, CA (US); Jonathan James Innes, Cupertino, CA (US); Sandra Newsome, San Mateo, CA (US); Mien Lin Tan, Singapore (SG); Anne Truitt, McLean, VA (US); Govind Jayanth, Union City, CA (US); Alan Fothergill, San Francisco, CA (US); Peggy Larson, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 601 days.

(21) Appl. No.: 09/777,513

(22) Filed: Feb. 6, 2001

(65) Prior Publication Data
US 2001/0047332 A1    Nov. 29, 2001

(51) Int. Cl.
*G07F 17/00* (2006.01)
(52) U.S. Cl. .......................................... 705/30; 705/40
(58) Field of Classification Search .................... 705/8, 705/35, 39, 36, 40, 30
See application file for complete search history.

(56) References Cited

U.S. PATENT DOCUMENTS

| 5,121,945 | A | * | 6/1992 | Thomson et al. ............. 283/58 |
| 5,699,528 | A | * | 12/1997 | Hogan .......................... 705/40 |
| 5,758,329 | A | * | 5/1998 | Wojcik et al. ................ 705/28 |
| 5,802,499 | A | * | 9/1998 | Sampson et al. ............. 705/35 |
| 5,991,733 | A | * | 11/1999 | Aleia et al. .................... 705/8 |

(Continued)

OTHER PUBLICATIONS

Marshall, Martin "Oracle Apps Now Web-Enabled" May 6, 1996, CommunicationsWeek, p. 15.*

(Continued)

*Primary Examiner*—Lynda Jasmin
(74) *Attorney, Agent, or Firm*—Young Law Firm, P.C.

(57) ABSTRACT

A computer-implemented and Internet-based method of managing Accounts Receivable (AR) information includes steps of receiving a customer request for remote Internet access to AR information (such as pending invoices) owned by vendor; retrieving the customer's AR information from a database and enabling the retrieved AR information to be remotely displayed for the customer and enabling the vendor's internal personnel to retrieve and to display the customer's AR information simultaneously as the AR information is displayed for the customer. The customer may dispute an invoice accessed from the database by accessing the vendor's Web site and by selecting a reason code for the dispute and at least a disputed amount to create a pending Credit Memo Request, all without direct manual involvement from the vendor. The pending Credit Memo Request may then sent to and routed through a selected process for the selected reason code, a selected hierarchy of persons empowered to approve Credit Memo Request incorporating the selected reason code and/or a primary approver for the selected reason code. Upon approval of the Credit Memo Request, a Credit Memo may be automatically generated and the disputed amount may be credited to the disputed invoice. The customer may be notified of the approval or rejection of the Credit Memo Request, as may be selected personnel internal to the vendor. Real time balances may be available to the customer on a self-serve basis, as are other common AR-related services.

52 Claims, 5 Drawing Sheets

U.S. PATENT DOCUMENTS

| | | | |
|---|---|---|---|
| 5,995,948 A * | 11/1999 | Whitford et al. | 705/41 |
| 6,049,786 A * | 4/2000 | Smorodinsky | 705/40 |
| 6,084,953 A * | 7/2000 | Bardenheuer et al. | 379/114.01 |
| 6,115,690 A * | 9/2000 | Wong | 705/7 |
| 6,144,726 A * | 11/2000 | Cross | 379/114.03 |
| 6,385,595 B1 * | 5/2002 | Kolling et al. | 705/40 |
| 6,473,740 B2 * | 10/2002 | Cockrill et al. | 705/27 |
| 6,785,661 B1 * | 8/2004 | Mandler et al. | 705/39 |
| 2001/0012346 A1 * | 8/2001 | Terry | 379/112.01 |
| 2002/0007343 A1 * | 1/2002 | Oyama et al. | 705/39 |
| 2002/0065723 A1 * | 5/2002 | Anderson et al. | 705/14 |
| 2002/0138389 A1 * | 9/2002 | Marton et al. | 705/36 |
| 2003/0065563 A1 * | 4/2003 | Elliott et al. | 705/14 |
| 2003/0135457 A1 * | 7/2003 | Stewart et al. | 705/39 |

OTHER PUBLICATIONS

Attaway, Morris "Billing Risks & SAP R/3" Aug. 1999, Internal Auditor, v56n4, pp. 42-47.*

Silverman, David "ADR is an Effective Tool to Resolve Business and Account Receivable Disputes" Commercial Law Bulletin v11n2, pp. 19-21, Mar./Apr. 1996; File 15, Dialog No. 01312293.*

* cited by examiner

FIG. 2

ACCOUNT INFORMATION
Enter Search criteria, such as amount, date, invoice, purchase order or order number

SEARCH FOR: | 123432 |  ~216

LIMIT TO:
```
ALL TRANSACTIONS
ALL OPEN ITEMS
ALL INVOICES
    ALL OVERDUE INVOICES
    ALL OUTSTANDING
    INVOICES
    ALL CLOSED INVOICES
```
~218

[SEARCH NOW]

_Advanced Search_ ~214

214~

| Details ~212 | Transaction ▽ | Status ▽ | Date ▽ ~210 | Purchase Order ▽ ~210 | Sales Order ▽ ~210 | Original Amount ▽ ~210 | Remaining Amount ▽ ~212 |
|---|---|---|---|---|---|---|---|
| 🖶 | inv-1000 | Open | 06/14/99 | | | 110 | 0 |
| 🖶 | 200260 | Open | 06/01/99 | | | 100 | 100 |
| 🖶 | 10813 | Open | 01/08/99 | GBX-1100 | O-921, O-687 | -45 | 0 |
| 🖶 | 10809 | Open | 01/08/99 | 01-DDBHY-89 | O-921 | 24,520.20 | 10,500.50 |
| 🖶 | 123432 | Open | 12/22/99 | GBX-1100 | | 5,632.50 | 5,632.50 |

220 ➤ ACCOUNT BALANCE: USD 16,233.00

200

METHODS AND SYSTEMS FOR ONLINE SELF-SERVICE RECEIVABLES MANAGEMENT AND AUTOMATED ONLINE RECEIVABLES DISPUTE RESOLUTION

BACKGROUND OF THE INVENTION

1. Field of the Invention

This invention relates to computer-implemented systems and methods for self-service management of Accounts Receivables (AR) over a computer network, such as the Internet. This invention also relates to computer-implemented and Internet-based systems and methods for the disputing one or several invoices in a deploying company's AR system.

2. Description of the Related Art

Each year, analysts project increased growth in both the volume and the value of online transactions over the World Wide Web (hereafter, the "Web"). Every year, the actual volume and value of the goods and services transacted over the Web has exceeded these projections. As the world becomes increasingly mobile, wireless and connected, seamless and complete Web connectivity has revealed itself to be central to processing transactions faster, easier, at lower costs and at higher profit margins.

The increasing ubiquity of the Web in commercial transactions has led companies to examine their business processes closely, to evaluate their effectiveness and to develop possible improvements. Accounts Receivables is one area that has yet to benefit from a comprehensive overhaul to take advantage of the possibilities offered by the Internet. Indeed, AR is conventionally handled by a variety of means, the most fundamental being the paper invoice sent by a vendor to its customer. Customers need to manage their AR accounts with each vendor, although they may not perceive their actions as AR management. Traditionally, such AR management includes contacting the vendor's customer service or collections department over the telephone, email or facsimile for each question and each request. The vendor would then retrieve the customer's data and perform some action, whether it is to provide the customer with a copy of an invoice or create and process a Credit Memo Request, for example. Other common customer requests and questions include requests for an account balance, inquiries related to payments being applied to invoices, requests for amounts past due, inquiries asking whether all credits have been applied to the proper account, for example. Responding to these requests and questions is traditionally a burdensome manual process for both parties involved in the transaction. The vendor must dedicate substantial HR resources to their AR department and the customer expends time and money repeatedly performing transactions that do not positively contribute to their bottom line.

This administrative burden, moreover, disproportionably rests on the shoulders of the vendor, as it must repeatedly collect, process and analyze data provided by each of its customers in order to satisfy the customers' requests or respond to the customers' questions. However, as between the customer and the vendor, it is the customer that often has the superior (most accurate, most up to date) information. Indeed, the customer knows why she deserves a credit or knows which invoice is duplicate, for example. There is believed to have been a long felt need, therefore, for methods and systems that enable customers self-service access to their AR information. Self-service access to AR information would improve communications between customer and vendor, would reduce costs and improve both the quality and timeliness of the services provided. Enabling self-service access to vendor AR information would decrease the administrative burden of fielding the wide range of customer requests and questions and would improve collections and cash flow and enable the vendor to focus on strategy, rather than administration. When an organization is focused on strategy, rather than on trying to keep up with volume of data entry and customer requests, costs decrease and efficiency increases. Eventually, a smaller percent of the vendor's time may be spent on transaction control and processing, and more time may be spent on activity planning, optimizing, and analyzing. Thus, by enabling self-service access to AR information and by correspondingly freeing up data processing resources, the vendors' finance departments may undergo a transformation from a mere processing center to a full-fledged strategic planning center.

Self-service access to AR information, however, would only free the vendor from the more mundane tasks traditionally associated with responding to customers' inquiries and questions. The resolution of invoice and account disputes constitutes another significant drain on human resources within a typical AR department. Indeed, customers must be able to communicate disputes to their vendors. Such disputes must be tracked and resolved. Traditionally, customers would "manage" such disputes indirectly: they would call the vendor's sales representative, customer service or collections department and verbally explain the nature of the dispute. Such a dispute processing methodology is wasteful in both time and resources to both parties to the dispute. What are needed, therefore, are methods and systems to allow customers to initiate disputes without active manual involvement form the vendor.

SUMMARY OF THE INVENTION

An object of the present invention, therefore, is to provide methods and systems for remote self-service access to AR information. Another object of the present invention is to provide customers with the means to dispute an account balance or an invoice online.

In accordance with the above-described objects and those that will be mentioned and will become apparent below, a computer-implemented and Internet-based method of managing Accounts Receivable (AR) information, according to an embodiment of the present invention, comprises the steps of receiving a customer request for remote Internet access to AR information that is owned by a deploying company; retrieving the customer's AR information from a database and enabling the retrieved AR information to be remotely displayed for the customer and enabling personnel at the deploying company to retrieve and display the customer's AR information at any time, even simultaneously as the AR information is displayed for the customer. Most any number of customers, moreover, may access their AR information at any time. In addition, most any number of internal AR personnel may access the AR information at any time (24 hours a day, 7 days a week), even simultaneously as the customers are accessing the same AR information.

According to further embodiments, the AR information may be displayed on a World Wide Web (Web) browser or other suitable application. Keyword searching of the AR information stored in the database may be enabled through a Web browser to retrieve any information stored in the database that matches an entered search criteria, irrespective of a category in which the information is stored in the database. The keyword searching may allow restricted searching based on an amount range, date range, due date range, category, customer, customer location, applied payments, open items, closed items, pending items, Credit Memo Requests, Credit Memos, a document number and/or any data categorization the database. The keyword searching across all customer AR information may be restricted to personnel of the deploying company. The retrieved AR information may include invoice information that is optimized for printing in a format that matches a format of a corresponding paper invoice. A step of restricting access to the AR information by the personnel of the deploying company to selected personnel may also be carried out. The selected personnel may include, for example, collectors, accountants, AR personnel of the deploying company and/or sales personnel.

A step of enabling customers to dispute one of all and a portion of an invoice and to create and submit a Credit Memo Request may also form part of the above-described method. To do so, a plurality of reason codes for disputing the invoice may be provided, each of the reason codes being mapped to a corresponding user interface, the user interface displaying only information specific to its corresponding reason code. Each of the reason codes may include a flag that determines whether the reason code is visible only to personnel of the deploying company or is visible to both the personnel of the deploying company and to the customers external to the vendor. The reason codes visible only to the personnel of the deploying company may include bankruptcy and goodwill, for example. The reason codes visible to the customers may include freight, tax, shipping, duplicate invoice and/or a specific invoice line, for example.

The method may implement a workflow engine, the workflow engine defining and enforcing a hierarchical routing of the Credit Memo Request as the Credit Memo Request is processed by the deploying company. A step of automatically generating a Credit Memo Request and updating the customer's AR information in real time when the Credit Memo Request is approved may also be carried out. The workflow engine may carry out a step of notifying the customer and/or selected personnel of the deploying company when the Credit Memo Request is approved and a corresponding Credit Memo is generated. The notifying step may be carried out by email and/or by updating a Web site, for example. A step of marking an invoice against which a Credit Memo Request has been submitted may be carried out.

The customer request for remote access may include customer authentication data, which may, for example, be stored in the customer's computer system as a cookie. The retrieved and displayed customer AR information may include a summary screen summarizing the customer's AR information. The method may also include the step of hyperlinking some or all of the summarized AR information on the summary screen to enable the customer to view detailed AR information corresponding the hyperlinked summarized AR information. The retrieved and displayed AR information may include information related to invoices, payments, Credit Memos applied to a particular invoice, Credit Memos applied to an entire customer account and/or Credit Memo Requests, for example. The displayed AR information may be dynamically sortable and the method may further comprise the step of sorting and re-displaying the displayed AR information. The appearance of the displayed AR information may be customizable to match the corporate identity of the deploying company. The displayed AR information may include a first portion (such as the top portion) and a second portion (such as the bottom portion), the first portion displaying static AR information including customer name, customer number and the second portion displaying dynamic AR information that changes depending upon an action by the customer. The second portion may be adapted to include invoice information and configurable messages from the deploying company. A step of displaying a button along with the displayed AR information may be carried out, wherein clicking on the button causes all activities associated with a currently displayed item to be displayed.

The present invention is also a computer-implemented and Internet-based method of disputing an invoice from a vendor to a customer, comprising the steps of accessing a database record corresponding to the invoice to be disputed over a Web site of the vendor; selecting a reason code for the dispute along with an identification of a disputed amount; validating a Credit Memo Request incorporating the selected reason code and the disputed amount to create a pending Credit Memo Request; causing the Credit Memo Request to be sent to and routed through at least one of a selected process for the selected reason code, a selected hierarchy of persons empowered to approve Credit Memo Request incorporating the selected reason code and a primary approver for the selected reason code and receiving a notification upon approval or rejection of the pending Credit Memo Request, the disputed amount being automatically credited to the disputed invoice when the pending Credit Memo Request is approved.

According to still further embodiments, the selecting step may select a reason code from among a group of reason codes including freight charges, taxes, shipping charges, duplicate invoice, specific invoice line and at least one vendor-defined reason code, for example. When the selected reason code does not fit a reason for requesting the Credit Memo, the selecting step may further include a step of adding explanatory comments to a blank field, thereby enabling the established hierarchy of persons empowered to approve the validated Credit Memo Request and the primary approver for the selected reason code to process the Credit Memo Request. The validating step may include a step of submitting the Credit Memo Request if the Credit Memo Request is correct and may include the step of correcting the Credit Memo Request if any information appearing thereon is incorrect. The validating step may include a step of displaying the Credit Memo Request for the customer and giving the customer a first option to submit the Credit Memo Request to execute the causing step and a second option to return to an earlier screen to correct any incorrect information on the Credit Memo Request. The reason codes, process, hierarchy and primary approver may be defined by the vendor upon enabling the computer-implemented method. A step of authenticating a customer before allowing the customer to carry out the accessing step may also form part of the method. A step of accessing a current status of the pending Credit Memo request in real time may also be carried out. The method may further include a step of marking the disputed invoice with a legend or indicia indicating that a Credit Memo Request is pending there against.

The present invention, in another aspect thereof, is an Internet-based electronic system for enabling remote access and management of Accounts Receivable (AR) information of a deploying company, comprising a database that configured to store the AR information; a first computer arranged to receive a customer request for remote Internet access to the AR information, to retrieve the AR information from the database upon receiving the customer request and to enable the retrieved AR information to be remotely displayed for the requesting customer; a second computer arranged to enable personnel at the deploying company to retrieve and display the customer's AR information at any time, even simultaneously as the AR information is displayed for the customer.

The AR information may be displayed on each of the first and second computers using a World Wide Web (Web) browser or other suitable. Each of the first and second computers may be further arranged to carry out keyword searching of the database through a Web browser to retrieve any information stored in the database that matches an entered search criteria, irrespective of a category in which the information is stored in the database.

The present invention may also be viewed as an Internet-based electronic system for disputing an invoice from a vendor to a customer, comprising a database configured to store the invoice; a computer adapted to connect to the Internet; a Web site, the Web site being controlled by the vendor and accessible by the computer, the Web site being configured to allow a customer using the computer to remotely access the invoice and to dispute the invoice by: selecting a reason code for the dispute and at least a disputed amount; validating a Credit Memo Request incorporating the selected reason code and the disputed amount to create a pending Credit Memo Request, and causing the Credit Memo Request to be processed through a workflow engine to send and route the Credit Memo Request through at least one of a selected process for the selected reason code, a selected hierarchy of persons empowered to approve Credit Memo Request incorporating the selected reason code and a primary approver for the selected reason code.

The workflow engine may further be configured to send a notification upon approval or rejection of the pending Credit Memo Request, the disputed amount being automatically credited to the disputed invoice when the pending Credit Memo Request is approved. The Web site may also allow the customer to add explanatory comments to a blank field, to enable the selected hierarchy of persons empowered to approve the validated Credit Memo Request and the primary approver for the selected reason code to process the Credit Memo Request when the selected reason code does not fit a reason for requesting the Credit Memo Request. The Web site may also enable the submission of the Credit Memo Request if the Credit Memo Request is correct and the correction of the Credit Memo Request if any information therein is incorrect. The reason codes, process, hierarchy and primary approver may be predefined by the vendor. The Web site may further be configured to authenticate a customer before allowing the customer to access the invoice. Real time access to the status of the pending Credit Memo request may also be available through the Web site of the present invention. The disputed invoice may be marked with a legend or indicia indicating that a Credit Memo Request is pending there against.

BRIEF DESCRIPTION OF THE DRAWINGS

For a further understanding of the objects and advantages of the present invention, reference should be made to the following detailed description, taken in conjunction with the accompanying figures, in which:

FIG. 2 is a representation of an "Account Details" Web page, according to an embodiment of the present invention.

DESCRIPTION OF THE INVENTION

Functional Description

Figure 1:
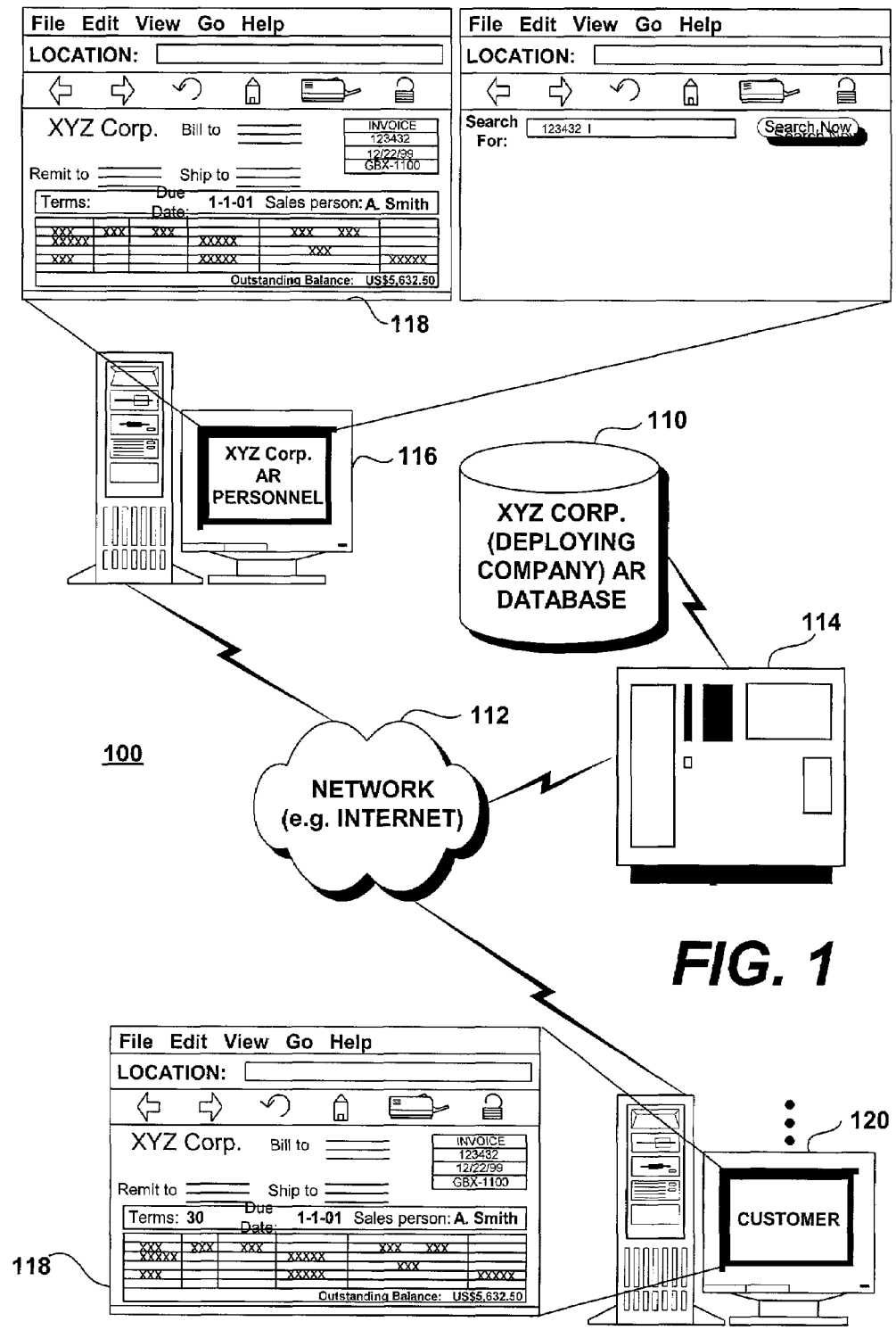
FIG. 1 is a diagram of a system and method for online self-service accounts receivable management, according to an embodiment of the present invention.

The present invention, according to an embodiment thereof, is a computer-implemented and Internet-based method of managing Accounts Receivable (AR) information. The present invention allows a customer to remotely access his or her account information in the vendor's AR database and allows the vendor's internal personnel to simultaneously access the same account information as is accessed by the customer. The present invention, moreover, allows the customer to carry out selected actions on the accessed AR information, such as to pay an invoice, to obtain a duplicate invoice, to check whether a payment has posted to an account, to dispute any portion of an invoice, and the like, all without intervention from the vendor's accounts receivable department or the vendor's customer service department. FIG. 1 is a diagram of a system 100 and method for online self-service AR management, according to an embodiment of the present invention. As shown therein, the system 100 may include one or more servers 114 that are configured to run an Internet application embodying aspects of the present invention. The server(s) 114 is coupled to a network 112 that includes, for example, the Internet. The server 114 also has access to the AR database 110 of the company deploying the method and system of the present invention—that is, the vendor. According to the present invention, the Internet application embodying the present invention and the AR information database 110 are accessible to two classes of users. The first class of such users includes the vendor's internal personnel. Such internal personnel (collectively represented in FIG. 1 as computer 116) includes accountants, customer service personnel, and collectors assigned to insure timely collection of outstanding receivables for the vendor and all other personnel that require access thereto. For example, such internal personnel 116 may also include a sales person assigned to the customer, as the compensation of such employees may be tied to both sales and collections. Although the present invention allows the vendor's internal personnel access to the AR information, the user interface, according to one embodiment, is optimized for customer access, and may not be optimal for large-scale data entry. Thus, the present invention may function in concert with one or more other core accounts receivables applications more suited to large-scale data entry tasks.

The second class of users is the vendor's customers, collectively represented in FIG. 1 as computer 120. According to the present invention, the customer 120 may remotely log onto the server 114 over the network 112, preferably using a secure communication protocol, such as Secure Socket layer (SSL), for example, over the World Wide Web (hereafter "Web"). According to an embodiment of the present invention, both the customer 120 and the vendor's own internal users 116 log onto the server 114 using commonly available browser software, such as Netscape Navigator, or the like.

Upon being properly authenticated, the customer 120 may be sent to an "Account Details" Web page. The Account Details Web page 200, shown at FIG. 2, allows the customer to view, in a tabular format, all of his or her outstanding invoices, account balances, etc. The information displayed in the Accounts Details page is particular to the logged-on customer only. The level of security (access to customer information) may be controlled by the system administrator of the deploying company (the vendor's system administrator, for example) when assigning user names and user passwords to its customers 120. According to an embodiment of the present invention, the Web pages displayed are dynamic in nature and may vary depending upon user input. For example, as shown in FIG. 2, each of the column headings 212 may be determined by the nature of the information displayed. Each of the column headings may include, for example, an up or down arrow 210. This feature allows the user to sort the displayed data in ascending or descending order (i.e., either numerically or alphabetically). Additional columns may be added to the Account Details page of FIG. 2, and columns may be removed therefrom, at the user's option. Therefore, instead of capturing the data and exporting it to a separate spreadsheet for analysis, the user 120, according to the present invention, may dynamically re-configure the displayed information to suit his or her needs. To accomplish this, Hyper Text Markup Language (HTML) and/or Dynamic Hyper Text markup Language (dHTML) may be used, as set forth, for example, in Musciano & Kennedy, *HTML, The Definitive Reference*, 3$^{rd}$ Edition, © 1998, O'Reilly & Associates and Goodman, *Dynamic HTML: The Definitive Reference*, © 1998, O'Reilly & Associates, the entire text of each being incorporated herein by reference.

For ease of reference, many or all of the entries in the Account Details page of FIG. 2 may be hyperlinked, to allow the user to "drill down" to see additional information on the selected entry. For example, the invoice 123432 in FIG. 2 may be selected by the click of a pointing device, (such as a mouse, for example) and the underlying invoice would be displayed on the user's browser, in printable format, as shown at 118 in FIG. 1. As many different records may be displayed in the Account Details screen 200, Web-style pagination may advantageously be employed. For example, the first 10 records may be initially displayed on the Account Details page, and subsequent groups of 10 may be sequentially displayed by clicking an appropriate link thereto. To assist the user 120 in finding the invoice or other item of interest, searching capabilities are included, as shown at reference numerals 214 in FIG. 2. According to the present invention, a keyword search may be carried out to search for any record, using any field. For example, a search criteria entered in the search window 216 will cause the search engine to search all of the customer's records containing the matching criteria, irrespective of a category in which the information is stored in the database.

For example, entering "O-921" in the search window 216 will cause the retrieval of the records for invoices 10813 and 10809, as both include the matching criteria "O-921" in the "Sales Order" column. The search may be further narrowed by limiting the search to only certain items, such as all overdue invoices, using pull-down menu 218. By selecting "Advanced Search", also shown at 214, the user 120 may limit the search even further by specifying, for example, an amount range, a due date range and/or a date range, for example. Wildcard searching, such as in the keyword "108**" (wherein the symbol "*" represents any character) is also supported in the present invention, and such a keyword will return invoices 10813 and 10809, as both invoices begin with the digits "108". Preferably, real time account and/or invoice balances are displayed, as shown at 220 in FIG. 2.

Whereas the customer 120 may search only within his or her own AR information, as shown in the Account Details page of FIG. 2, the vendor's own internal AR personnel (116 in FIG. 1) may, depending upon an assigned permission level, search the entire database 110, across customers 120. Thus, when one of the vendor's AR personnel, for example, enters a search criteria of "123432", as shown at 216, all records containing "123432" may be retrieved, including that of invoice 123432, as shown at 118 in FIG. 1.

As shown in FIG. 1, both the vendor's AR personnel 116 and the customer 118 may both simultaneously access the same AR information; in this example, a screen representation of invoice number 123432, as shown at 118. In practice, this means that one of the vendor's collectors 116 and the customer 120 may both look at the same invoice at the same time. For example, the customer 120 may have a question about his or her invoice that cannot be addressed by the self-service features of the present invention, or may require some additional assistance. In that case, the vendor's collector 116 and the customer 120 may engage in a telephone conversation while looking at the same information at the same time, displayed on their respective computers' Web browsers. This may greatly simplify addressing the customer's concerns while simultaneously educating the customer as to the capabilities and functionality of the AR system according to the present invention.

Figure 3:
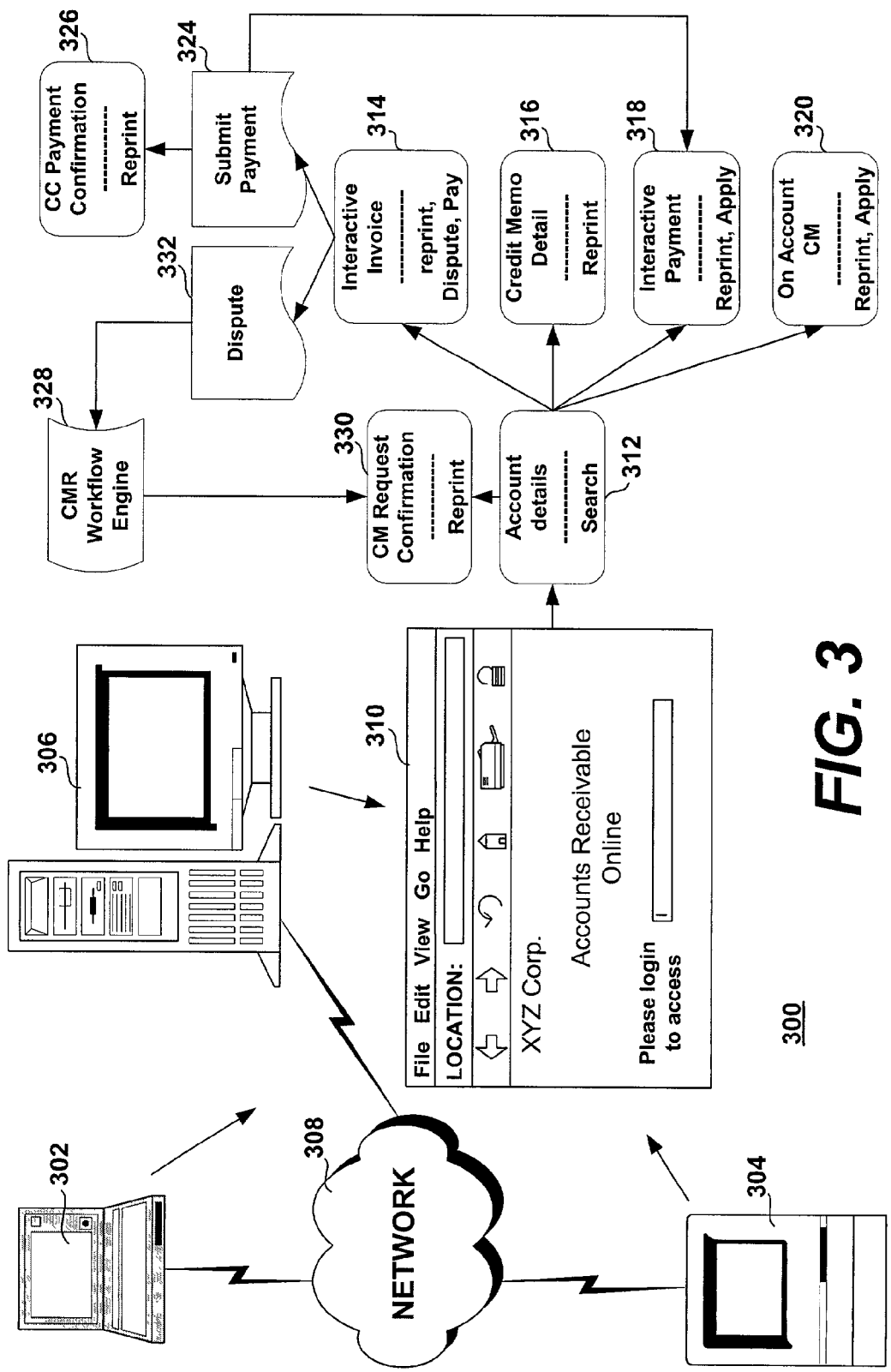
FIG. 3 is a diagram detailing a logical organization and task flow of the online accounts receivable system according to an embodiment of the present invention.

FIG. 3 is a diagram detailing a logical organization and task flow of the online accounts receivable system 300 according to an embodiment of the present invention. As shown therein, the system 300 may include a plurality of users 302, 304 and 306. The users 302, 304 and 306 include both internal AR personnel of the deploying company (accountants, collectors, etc.) and customers. Each of the users 302, 304 and 306 may access the login page 310 of the AR application embodying the present invention via the network 308. After being properly authenticated, the user 302, 304, 306 may be presented the Account Details page 312, as shown in FIG. 2 if the user 302, 304, 306 is a customer and, if the user 302, 304, 306 is internal to the vendor, may be presented with a search page allowing the user 302, 304, 306 to search the entire database 110, across all customers. From either the Account Details 312 or the search page (not shown), the user 302, 304, 306 may access a number of other pages 314, 316, 318, 320, 326 or 330, each of which allowing the user 302, 304, 306 to carry out respectively different actions. Starting with the interactive Invoice page 314, the customer's invoice may be displayed in a manner similar to that shown at 118 in FIG. 1; that is, in a manner that resembles a paper invoice the user 302, 304, 306 may have received. The invoice information (the AR information) may be advantageously printed in HTML and/or dHTML to create a printable page. Such a printed invoice may advantageously include the invoice header information, balance and invoice lines. From the Interactive Invoice page 318, the user 302, 304, 306 may be presented with the opportunity to print the invoice, dispute the invoice, pay the invoice by credit card or other payment instrument, apply a previously made payment to be invoice and/or to view past activities on the displayed invoice. More than one invoice may be displayed at a time, and each invoice may open in a separate new window on the user's browser.

If, as shown at 324, the user 302, 304, 306 wishes to submit a payment, he or she may be sent to the Credit Card Payment Confirmation page 326, whereupon the user 302, 304, 306 may be prompted to enter the relevant information to enable payment of an invoice by credit card or other payment instrument. After verifying the payment information, the user 302, 304, 306 may be presented with a printable payment confirmation page. Alternatively, the user 302, 304, 306 may select the Interactive Payment page 318, whereupon the user 302, 304, 306 may be presented with a page displaying payment header information, such as the date the payment was received, the amount of the payment, the bank account from which payment was drawn, and the like. Receipt application may also be displayed. This page may also be displayed in a format substantially like the printed version thereof. The user 302, 304, 306 may also select to view any Credit Memos (CM) that may be tagged to their account, as shown at reference 320 in FIG. 3. Such credit memos may be printed for the customer's records and/or applied to the customer's account and/or to a specific pending invoice (if not already applied to their account and/or an invoice). From either the Interactive Payment page 318 or the On Account CM page 320, the is user 302, 304, 306 may choose the "Apply" option (i.e., click on a button labeled "Apply" or otherwise select the "Apply" option). Doing so may send the user 302, 304, 306 to an Apply Payment Web page, in which the user 302, 304, 306 may search for any unapplied payments he or she may have made, may search for a selected invoice and may apply the unapplied payment to the selected invoice and/or to the customer's account.

According to an embodiment of the present invention, the user 302, 304, 306 may dispute all or a portion of an invoice submitted by a vendor. To do, so, the customer 302, 304, 306 may click on or otherwise select the "Dispute" option, as shown at 332 in FIG. 3. After submitting the necessary information to create a Credit Memo Request (CMR), the created CMR is processed and routed according to a CMR workflow engine, as shown at 328 and a confirmation thereof may be printed at the page referenced by 330, which may also accessible from the Account Details page 312. When and if a Credit Memo is issued on the underlying Credit Memo Request, the user 302, 304, 306 may view and/or reprint the Credit Memo, as shown at 316.

A methodology for disputing an account and/or an invoice, according to an embodiment of the present invention, is set forth in detail below, with reference to FIG. 4. The reasons for disputing a bill are many, and include such reasons as returned items, no credit given for a returned item, invalid amounts, invalid taxes, freight, duplicate invoice, incorrect freight charges, and the like. Rather than requiring the customer 302, 304, 306 to telephone or fax the vendor's collection department, the present invention allows the customer 302, 304, 306 self-service access to the process of creating a Credit Memo Request. Indeed, it is the customer 302, 304, 306 that knows why a Credit Memo should be entered against their account or a specified invoice. The present invention, therefore, allows the customer 302, 304, 306 to initiate the process of creating such a Credit Memo request that, if approved, will result in the automatic generation of a Credit Memo. In turn, the Credit Memo will automatically credit the customer's account(s) and/or a specified invoice or invoices for the requested amount. Customers 302, 304, 306 are thus given an extensive ability to initiate and track their disputes, while vendors are given the tools to completely bind together and automate the processes for the creation and resolution of Credit Memo Requests.

Figure 4:
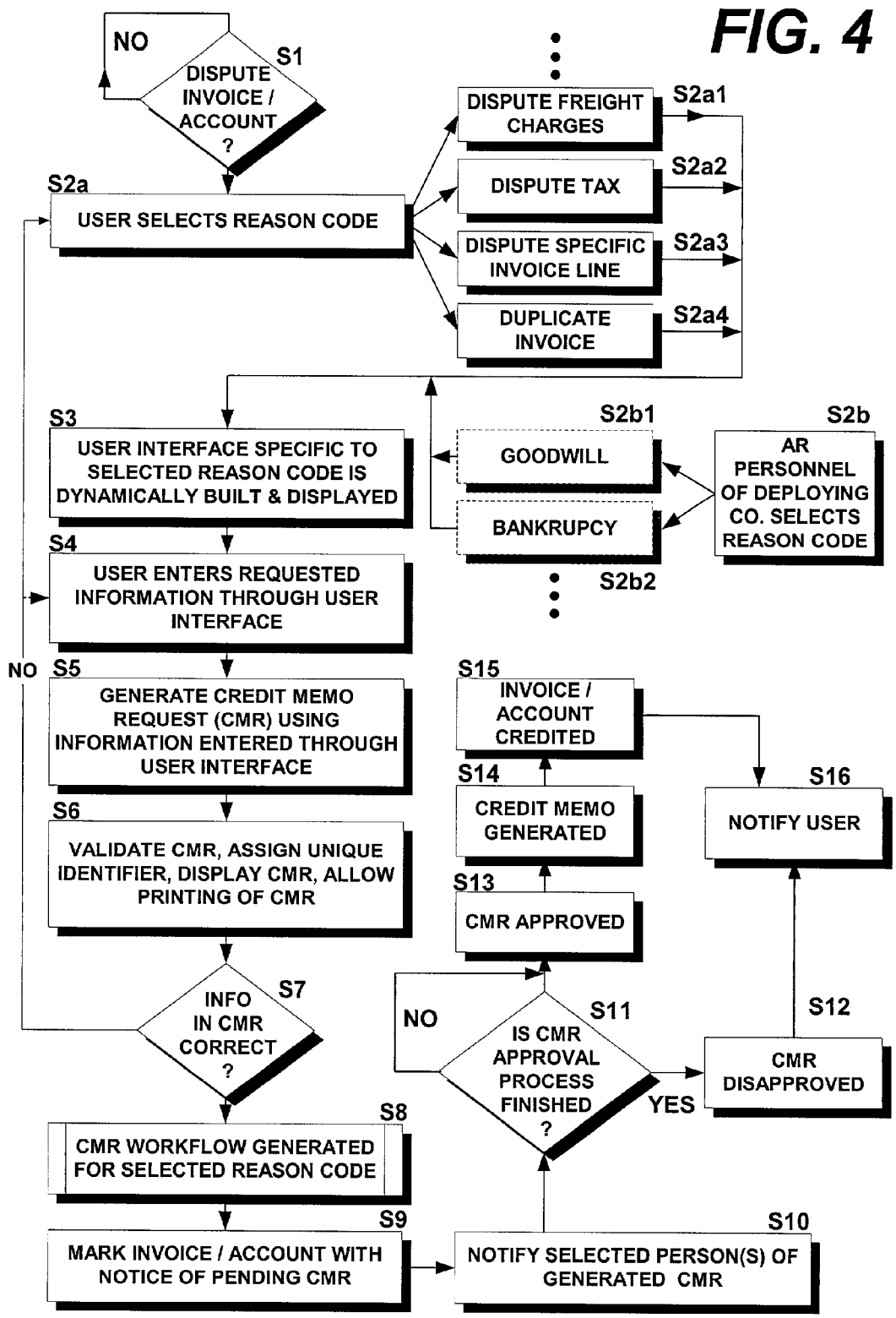
FIG. 4 is a flow chart of a method of initiating and automatically processing a dispute over an invoice from a vendor to a customer through the creation and processing of a Credit Memo Request, according to an embodiment of the present invention.

As shown in FIG. 4, if a customer 302, 304, 306 wishes to dispute an invoice and/or an account (step S1), he or she may be prompted to select one of a plurality of predefined reason codes, as shown in step S2*a*. The plurality of predefined reason codes may include codes for disputing freight charges, as shown at S2*a*1, disputing taxes applied as shown at S2*a*2, disputing a specific invoice line, as shown at S2*a*3 or disputing a duplicate invoice, as shown at S2*a*4, for example. Other reason codes may readily be defined, as each deploying company (e.g., vendor) may allow invoices and/ or accounts to be disputed for reasons other than shown in FIG. 4. The customer 302, 304, 306, moreover, may be given the opportunity to enter explanatory comments regarding the requested Credit Memo Request. It is preferable that the entire universe of reason codes be defined, as there is preferably no "Other" reason code. Indeed, it is preferable to fit the dispute into one of the plurality of predefined reason codes, so as to allow the automatic processing thereof, as it may be difficult to automate the processing of a Credit Memo Request in which the reason for the underlying dispute has not been clearly defined. A pull down menu may include a listing of all of the reason codes that may be utilized. However, there may be instances wherein the reason code selected does not precisely define that portion of the invoice that is to be disputed. For those reason codes, additional nested pull down menus may be provided, which prompt the user to specify the invoice portion that is the subject of the dispute. Reason codes S2*a*1, S2*a*2, S2*a*3 and S2*a*4 are examples of dispute reason codes that may be visible to the customer 302, 304, 306. However, not all reason codes need be visible on the Web page displayed to the customer 302, 304, 306. Indeed, the vendor may have other reasons for granting a Credit Memo Request, such as goodwill to a particularly valuable or loyal customer, as shown at S2*b*1 or the bankruptcy of the customer 302, 304, 306, as shown at S2*b*2. Such reason codes would be visible and selectable only to the AR personnel of the deploying company (vendor), as determined by the login profile of the user (saved in the user's computer as a cookie, for example). Other reason codes that are not visible to the customer 302, 304, 306 may also be predefined. A flag may be defined, which defines whether the reason code is visible to the customer 302, 304, 306 or only to the vendor's internal personnel.

After an appropriate reason code is selected by the customer 302, 304, 306 or the internal AR personnel, a user interface specific to the selected reason code is dynamically built and displayed to the requesting party. Indeed, each reason code S2*a*1, S2*a*2, S2*a*3, S2*a*4, S2*b*1, S2*b*2 (and any other reason code that may have been added) may be mapped to a separate user interface that prompts the user to enter the information relevant to the selected reason code, as shown at S4. Moreover, based upon the selected reason code, certain fields within the displayed user interface may be populated. For example, if the selected reason code is freight charges, the value(s) of the disputed freight charge(s) may be imported form the disputed invoice into the Credit Memo Request being created. After the customer 302, 304, 306 or the internal AR personnel has entered the requested information in the user interface mapped to the selected reason code, a Credit Memo Request may be generated, as shown at S5. Thereafter, the generated Credit Memo Request is validated (checked to insure that all mandatory information has been provided, for example), and assigned a unique identifier (for tracking purposes) such as a sequential number, as shown at S6. The validated Credit Memo Request may then be displayed for the requesting party; that is, the customer 302, 304, 306 or the internal AR personnel (such as 116 in FIG. 1). The requesting party may then verify the accuracy of all information appearing on the Credit Memo Request, as shown at S7. If any of the information is incorrect, the requesting party may be given the opportunity to correct or re-enter the inaccurate information by being sent back to step S2a to select a more fitting reason code or to step S4 to re-enter any inaccurate information in the user interface mapped to the selected reason code prior to re-submitting the corrected Credit Memo Request. Once the Credit Memo Request is submitted, appropriate tables within the database 110 may be populated with the Credit memo Request information of the validated and submitted Credit Memo Request.

When the information appearing the Credit Memo Request is deemed correct by the requesting party and the Credit Memo Request is submitted, a Credit Memo Workflow specific to the selected reason code is generated, as shown at S8. According to the present invention, the workflow engine defines and enforces the hierarchical routing of the Credit Memo Request as the Credit Memo Request is processed by the vendor. To enable such functionality, the deploying company must pre-define the hierarchy and routing for each type of Credit Memo Request. The hierarchy and routing may be the same for all Credit Memo Requests, irrespective of the selected reason code, or the hierarchy and routing may be different for each type of Credit Memo Request, depending upon the selected reason code. For example, the processing of Credit Memo Requests wherein the selected reason code indicates that it is based upon disputed freight charges will be routed differently than Credit Memo Requests based a "Duplicate Invoice" reason code. Indeed, the CMR based upon disputed freight charges may be routed to that person or persons in the vendor's AR department having responsibility for freight charges, whereas a CMR based upon a claim of duplicate invoice may be automatically granted upon verifying that the disputed invoice is indeed identical to another invoice for that same customer 302, 304, 306. The hierarchy established for each reason code may list persons having varying authorization levels; a higher placed person in the hierarchy may have the authority to approve a CMR for a higher amount than a lower-placed person in the hierarchy. Moreover, each person in the defined hierarchy may have to "sign off" on the Credit Memo Request in order for the CMR to be granted. In this manner, the workflow engine for that reason code may shepherd the generated CMR through its designated route through the pre-established hierarchy, thereby ensuring that the CMR approval process for that reason code is enforced. Thus, the approval/disapproval process for each generated CMR is constrained by the workflow, thereby ensuring that all prescribed approvals are obtained in a timely manner. Built-in escalation features may be defined in each workflow, the CMR being forced to the next level in the hierarchy or to the next step in the process upon the failure of any preceding step, again insuring that all submitted CMRs are processed in a timely manner.

As shown in step S9, the disputed invoice may be marked with a notice that a CMR is pending there against, preferably with the notation that the Credit Memo Request is but a request until it is approved and becomes a full-fledged Credit Memo. In this manner, the customer 302, 304, 306 may be assured that a CMR has been generated and is pending against the disputed invoice or account.

A notification may be generated as shown in step S10, to notify one or more selected AR personnel of the deploying company (the vendor) of the generation of the Credit Memo Request. Such a selected AR personnel may include, for example, the collector assigned to that account and/or the sales person listed on the disputed invoice. Such a notification may include an email to the collector and/or to other selected persons within vendor's organization and/or an entry in an internally accessible Web notification page. In this manner, the collector having charge of the customer's account, upon checking the Web notification page, would note the presence of a new CMR and would have the ability to click thereon to cause the underlying details of the CMR to be displayed.

If, after the CMR approval process is finished (step S11), the Credit Memo Request is disapproved as shown in step S12, the customer 302, 304, 306 is notified as shown in step S16, optionally including the reasons for the disapproved CMR in the notification. The notification, according to a preferred embodiment, is sent by email, although other notification means may be implemented. If, however, the CMR is approved, as shown at S13, a Credit Memo (CM) is automatically generated, advantageously without any intervention or manual entry from the vendor. Once the Credit Memo is generated, the underlying invoice and/or account is preferably automatically credited for the amount in dispute and the requesting party notified, as shown at S16. As the status of each invoice is updated in real time and accessible to the users (whether internal or external to the vendor), the requesting party may display the disputed invoice or account and verify first hand that the requested Credit Memo has been processed and that the disputed amount(s) has been credited to the proper invoice and/account.

Hardware Description

Figure 5:
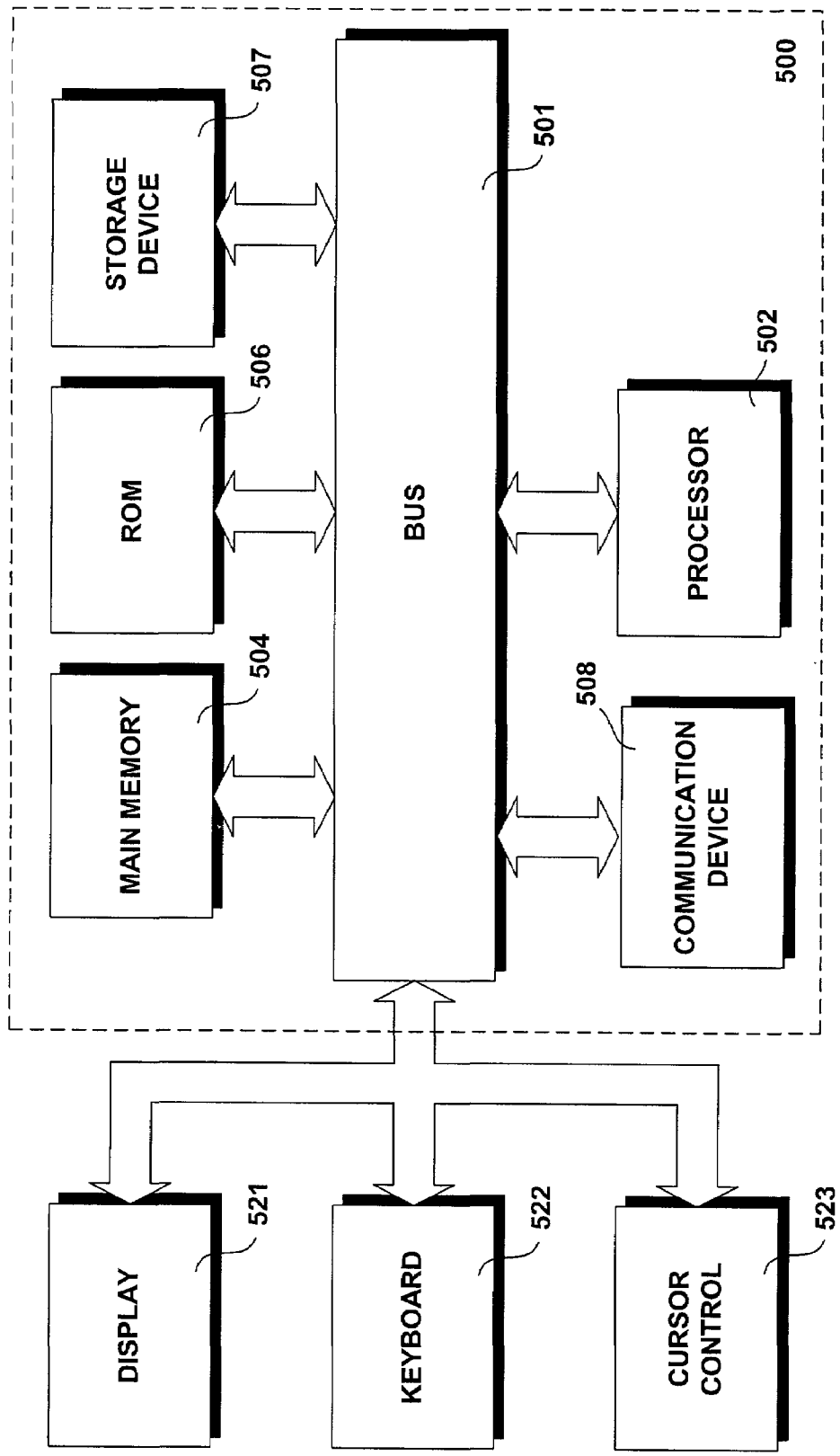
FIG. 5 is a block diagram of a computer suitable for implementing the present invention.

FIG. 5 illustrates a block diagram of a computer system 500 with which an embodiment of the present invention may be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions. A communication device 508, such as a modem or network (such as Ethernet, for example) card is also coupled to the bus 501 to provide access to a network, such as shown at 112 in FIG. 1 and 308 in FIG. 3.

The computer system 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device is cursor control 523, such as a mouse, a trackball, or cursor direction keys for communicating direction information and command selections to processor 502 and for controlling cursor movement on display 521.

The present invention is related to the use of computer system 500 to implement methods and systems for self-service AR management, according to the present invention. According to one embodiment thereof, the system for self-service AR management is provided by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to implement the methods disclosed herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of managing Accounts Receivable (AR) information over a computer network, comprising the steps of:
   receiving a customer request over the computer network for remote access to AR information that is owned by a deploying company;
   retrieving the customer's AR information from a database and enabling the retrieved AR information to be remotely displayed for the customer, the displayed information including an invoice;
   enabling personnel at the deploying company to retrieve and display the customer's AR information at any time, even simultaneously as the AR information is displayed for the customer, and
   enabling the customer to remotely dispute all or a portion of the displayed invoice by providing the customer with a user interface configured to enable the customer to create a credit memo request on the disputed invoice and configured to enable the customer to submit the customer-created credit memo request to the deploying company, the user interface being further configured to display a plurality of reason codes for disputing the invoice, each of the reason codes being mapped to a corresponding separate user interface, each of the separate user interfaces displaying only information specific to its corresponding reason code.

2. The method of claim 1, wherein the AR information is displayed on a World Wide Web (Web) browser.

3. The method of claim 1, further comprising the step of enabling keyword searching of the AR information stored in the database through a Web browser to retrieve any information stored in the database that matches an entered search criteria, irrespective of a category in which the information is stored in the database.

4. The method of claim 3, wherein the keyword searching allows restricted searching based on at least one of amount range, date range, due date range, category, customer, customer location, applied payments, open items, closed items, pending items, Credit Memo Requests, Credit Memos, a document number and any data categorization the database.

5. The method of claim 3, wherein the keyword searching across all customer AR information is restricted to personnel of the deploying company.

6. The method of claim 1, wherein the retrieved AR information includes invoice information that is optimized for printing in a format that matches a format of a corresponding paper invoice.

7. The method of claim 1, further comprising the step of restricting access to the AR information by the personnel of the deploying company to selected personnel.

8. The method of claim 7, wherein the selected personnel includes collectors, accountants, AR personnel of the deploying company and sales personnel.

9. The method of claim 1, wherein each of the reason codes includes a flag that determines whether the reason code is visible only to personnel of the deploying company.

10. The method of claim 9, wherein the reason codes visible only to the personnel of the deploying company include bankruptcy and goodwill.

11. The method of claim 1, wherein the reason codes visible to the customers include freight, tax, shipping, duplicate invoice and specific invoice line.

12. The method of claim 1, wherein the method implements a workflow engine, the workflow engine defining and enforcing a hierarchical routing of the Credit Memo Request as the Credit Memo Request is processed by the deploying company.

13. The method of claim 12, wherein the workflow engine carries out a step of notifying at least one of the customer and selected personnel of the deploying company when the Credit Memo Request is approved and a corresponding Credit Memo is generated.

14. The method of claim 13, wherein the notifying step is carried out by at least one of email and by updating a Web site.

15. The method of claim 1, further comprising the step of automatically generating a Credit Memo and updating the customer's AR information in real time when the Credit Memo Request is approved.

16. The method of claim 1, further comprising the step of marking an invoice against which a Credit Memo Request has been submitted.

17. The method of claim 1, wherein the customer request for remote access includes customer authentication data.

18. The method of claim 1, wherein the retrieved and displayed customer AR information includes a summary screen summarizing the customer's AR information.

19. The method of claim 18, further comprising the step of hyperlinking at least some of the summarized AR information on the summary screen to enable the customer to view detailed AR information corresponding the hyperlinked summarized AR information.

20. The method of claim 1, wherein the retrieved and displayed AR information includes information related to at least one of invoices, payments, Credit Memos applied to a particular invoice, Credit Memos applied to an entire customer account and Credit Memo Requests.

21. The method of claim 1, wherein the displayed AR information is dynamically sortable and wherein the method further comprises the step of sorting and re-displaying the displayed AR information.

22. The method of claim 1, wherein an appearance of the displayed AR information is customizable to match a corporate identity of the deploying company.

23. The method of claim 1, wherein the displayed AR information includes a first portion and a second portion, the first portion displaying static AR information including customer name, customer number and the second portion displaying dynamic AR information that changes depending upon an action by the customer.

24. The method of claim 23, wherein the second portion is adapted to include invoice information and configurable messages from the deploying company.

25. The method of claim 1, further comprising the step of displaying a button along with the displayed AR information, wherein clicking on the button causes all activities associated with a currently displayed item to be displayed.

26. An electronic system for enabling remote access and management of Accounts Receivable (AR) information of a deploying company over a computer network, the system comprising:
   a database that configured to store the AR information;
   a first computer arranged to receive a customer request for remote access to the AR information over the computer network, to retrieve the AR information from the database upon receiving the customer request and to enable the retrieved AR information to be remotely displayed for the requesting customer, the displayed information including an invoice;
   a second computer arranged to enable personnel at the deploying company to retrieve and display the customer's AR information simultaneously as the AR information is displayed for the customer, and
   enabling the customer to remotely dispute all or a portion of the displayed invoice by providing the customer with a user interface configured to enable the customer to create a credit memo request on the disputed invoice and configured to enable the customer to submit the customer-created credit memo request to the deploying company, the user interface being further configured to display a plurality of reason codes for disputing the invoice, each of the reason codes being mapped to a corresponding separate user interface, each of the separate user interfaces displaying only information specific to its corresponding reason code.

27. The system of claim 26, wherein the AR information is displayed on each of the first and second computers using a World Wide Web (Web) browser.

28. The system of claim 26, wherein each of the first and second computers are further arranged to carry out keyword searching of the database through a Web browser to retrieve any information stored in the database that matches an entered search criteria, irrespective of a category in which the information is stored in the database.

29. A machine-readable medium having data stored thereon representing sequences of instructions which, when executed by computing device, causes said computing device to enable remote management of Accounts Receivable (AR) information over a computer network, by performing the steps of:
   receiving a customer request over the computer network for remote access to AR information that is owned by a deploying company;
   retrieving the customer's AR information from a database and enabling the retrieved AR information to be remotely displayed for the customer, the displayed information including an invoice;
   enabling personnel at the deploying company to retrieve and display the customer's AR information at any time, even simultaneously as the AR information is displayed for the customer, and
   enabling the customer to remotely dispute all or a portion of the displayed invoice by providing the customer with a user interface configured to enable the customer to create a credit memo request on the disputed invoice and configured to enable the customer to submit the customer-created credit memo request to the deploying company, the user interface being further configured to display a plurality of reason codes for disputing the invoice, each of the reason codes being mapped to a corresponding separate user interface, each of the separate user interfaces displaying only information specific to its corresponding reason code.

30. The medium of claim 29, further comprising the step of enabling keyword searching of the AR information stored in the database through a Web browser to retrieve any information stored in the database that matches an entered search criteria, irrespective of a category in which the information is stored in the database.

31. The medium of claim 30, wherein the keyword searching allows restricted searching based on at least one of amount range, date range, due date range, category, customer, customer location, applied payments, open items, closed items, pending items, Credit Memo Requests, Credit Memos, a document number and any data categorization the database.

32. The medium of claim 30, wherein the keyword searching across all customer AR information is restricted to personnel of the deploying company.

33. The medium of claim 29, wherein the retrieved AR information includes invoice information that is optimized for printing in a format that matches a format of a corresponding paper invoice.

34. The medium of claim 29, further comprising the step of restricting access to the AR information by the personnel of the deploying company to selected personnel.

35. The medium of claim 34, wherein the selected personnel includes collectors, accountants, AR personnel of the deploying company and sales personnel.

36. The medium of claim 29, wherein each of the reason codes includes a flag that determines whether the reason code is visible only to personnel of the deploying company.

37. The medium of claim 36, wherein the reason codes visible only to the personnel of the deploying company include bankruptcy and goodwill.

38. The medium of claim 36, wherein the reason codes visible to the customers include freight, tax, shipping, duplicate invoice and specific invoice line.

39. The medium of claim 29, wherein the method implements a workflow engine, the workflow engine defining and enforcing a hierarchical routing of the Credit Memo Request as the Credit Memo Request is processed by the deploying company.

40. The medium of claim 39, wherein the workflow engine carries out a step of notifying at least one of the customer and selected personnel of the deploying company when the Credit Memo Request is approved and a corresponding Credit Memo is generated.

41. The medium of claim 40, wherein the notifying step is carried out by at least one of email and by updating a Web site.

42. The medium of claim 29, further comprising the step of automatically generating a Credit Memo and updating the customer's AR information in real time when the Credit Memo Request is approved.

43. The medium of claim 29, further comprising the step of marking an invoice against which a Credit Memo Request has been submitted.

44. The medium of claim 29, wherein the customer request for remote access includes customer authentication data.

45. The medium of claim 29, wherein the retrieved and displayed customer AR information includes a summary screen summarizing the customer's AR information.

46. The medium of claim 45, further comprising the step of hyperlinking at least some of the summarized AR information on the summary screen to enable the customer to view detailed AR information corresponding the hyperlinked summarized AR information.

47. The medium of claim 29, wherein the retrieved and displayed AR information includes information related to at least one of invoices, payments, Credit Memos applied to a particular invoice, Credit Memos applied to an entire customer account and Credit Memo Requests.

48. The medium of claim 29, wherein the displayed AR information is dynamically sortable and wherein the method further comprises the step of sorting and re-displaying the displayed AR information.

49. The medium of claim 29, wherein an appearance of the displayed AR information is customizable to match a corporate identity of the deploying company.

50. The medium of claim 29, wherein the displayed AR information includes a first portion and a second portion, the first portion displaying static AR information including customer name, customer number and the second portion displaying dynamic AR information that changes depending upon an action by the customer.

51. The medium of claim 50, wherein the second portion is adapted to include invoice information and configurable messages from the deploying company.

52. The medium of claim 29, further comprising the step of displaying a button along with the displayed AR information, wherein clicking on the button causes all activities associated with a currently displayed item to be displayed.

* * * * *

UNITED STATES PATENT AND TRADEMARK OFFICE
CERTIFICATE OF CORRECTION

PATENT NO. : 7,181,420 B2  
APPLICATION NO. : 09/777513  
DATED : February 20, 2007  
INVENTOR(S) : Gonen-Friedman et al.

It is certified that error appears in the above-identified patent and that said Letters Patent is hereby corrected as shown below:

On Title Page, Item (60), insert: -- Related U.S. Application Data  
Provisional application No. 60/183,714, filed Feb. 18, 2000. --

Signed and Sealed this

First Day of May, 2007

JON W. DUDAS  
*Director of the United States Patent and Trademark Office*